Figure 2:
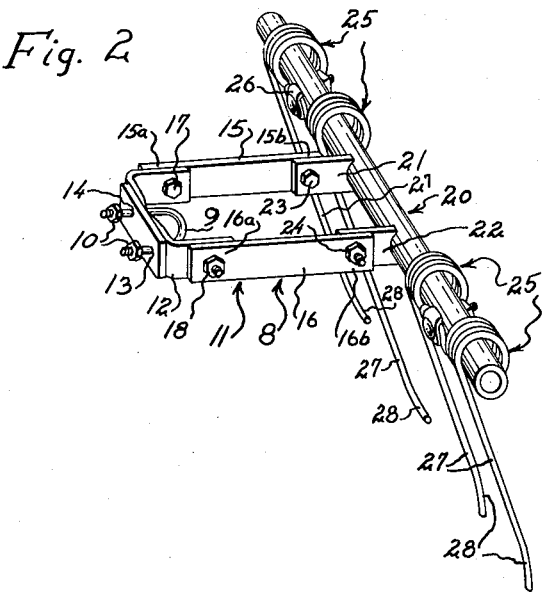

Sept. 10, 1957  G. SIEMS  2,805,613
GROUND LEVELING ATTACHMENT
Filed Sept. 2, 1953

INVENTOR.
GEORGE SIEMS
BY Williamson, Williamson,
Schroeder & Adams
ATTORNEYS

2,805,613
Patented Sept. 10, 1957

2,805,613

GROUND LEVELING ATTACHMENT

George Siems, Fairmont, Minn.

Application September 2, 1953, Serial No. 378,013

3 Claims. (Cl. 97—56)

This invention relates to ground working implements. More particularly, it relates to a soil leveling attachment for use in conjunction with ground working implements to level the soil in the wake of travel of such implements.

Many agricultural machines such as corn cultivators have ground working implements which are supported by upright shanks and which leave the soil in the wake of their travel in ridges and valleys. Soil left in such condition is especially susceptible to erosion and in addition, makes harvesting of the crops a very difficult, wasteful and damaging operation with respect to the crop and the harvesting machinery. For example, in harvesting corn, it is often desirable to harvest the corn along lines extending at right angles to the direction of travel of the ground-working implement the last time it passed through the corn. This means that if no means has been provided for leveling the soil behind the ground working implement, the harvesting machine must travel transversely of a plurality of substantially parallel valleys and ridges left in the soil by the ground working implement and in all probability accentuated by subsequent erosion. When such is the case, the harvesting machine is constantly climbing out of such valleys, over the ridges and dropping down into the next valley. This causes the harvesting machine to miss much of the corn and creates excessive wear and strain on the harvesting machine with attendant high maintenance and repair. My present invention is directed toward eliminating such conditions in an improved manner.

This invention is an improvement on my other ground agitating and leveling attachment for implements as disclosed and claimed in a prior application filed by me on February 9, 1953, Serial Number 335,631, now Patent No. 2,758,531, within the United States Patent Office and entitled Ground Agitating and Leveling Attachment for Implements.

It is a general object of my invention to provide a ground leveling apparatus for use in conjunction with ground working implements which is of cheap and simple construction and operation.

A more specific object is to provide a ground leveling attachment for ground working implements which may be readily attached to the shank of the implement and will level the soil in a simple, efficient and improved manner.

Another object is to provide a cheap and simple ground leveling attachment which will follow in the wake of a ground working implement upon attachment thereto and will efficiently work the soil laterally back into the valleys created by the implement.

Another object is to provide a ground leveling attachment of the type described which, after being attached to the shank of the implement, may be readily adjusted to compensate for any deformation of the shank of the supporting ground working implement so that it may continue to efficiently level the soil in the wake of the implement despite such deformation.

Another object is to provide an attachment of the type described having ground leveling agitators adjustable about an axis adjacent their upper ends and transverse to the direction of movement of the shank of the supporting ground working implement to permit the operator of the implement to vary at will the angularity of the agitators to the ground and thus accomplish different functions to greater or lesser degrees.

Figure 1:
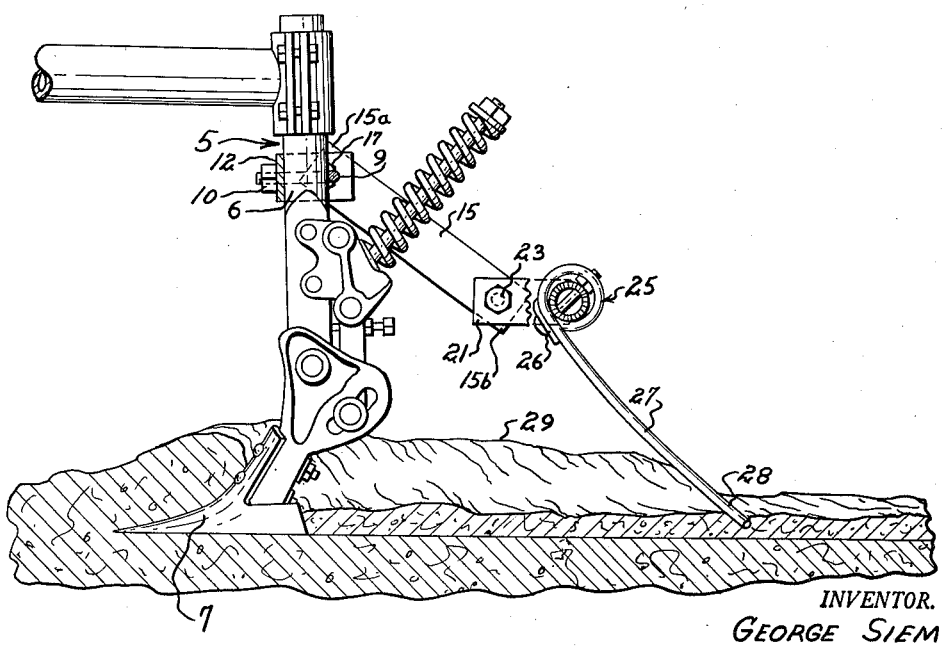

These and other objects and advantages of my invention will more fully appear from the following description made in connection with the accompanying drawings wherein like reference characters refer to similar parts throughout the several views and in which:

Fig. 1 is a vertical sectional view of one embodiment of my invention showing the supporting ground working implement in elevation; and Fig. 2 is a perspective view of the attachment.

My invention is especially adapted for use in conjunction with a ground working implement such as is shown in Fig. 1 and indicated generally by the numeral 5. Such a ground working implement normally has an upright shank 6 at the lower end of which is secured a cultivator shovel 7 or some similar ground engaging or working tool. My device may be manufactured as an attachment to a ground working implement sold separately therefrom or, of course, it may be included as a part of the original complete ground working implement. The entire attachment is indicated generally by the numeral 8. As best shown in Fig. 2, this unit 8 is provided with a U-shaped clamp member 9 threaded at each of its ends and carrying nuts 10 threaded thereon.

The unit 8, as shown, includes a framework indicated generally as 11 and comprised of a U-shaped support bracket 12. As best shown in Fig. 2, this U-shaped support bracket 12 has a pair of spaced apertures 13 and 14 through which the legs of the clamp member 9 may extend.

A pair of support arms 15 and 16 are fixedly secured to the rearwardly extending legs of the U-shaped member 12 by a pair of bolts 17 and 18 which extend through the legs of the U-shaped member 12 and through the forward and upper end portions 15a and 16a of the support arms. The two support arms 15 and 16 together with the U-shaped support bracket 12 complete the framework indicated generally as 11. This framework supports the rest of the attachment to be hereinafter described in a position rearwardly of the shank 6 and slightly above the ground in order to perform the desired functions. This can best be seen in Fig. 1. Each of the support arms 15 and 16 are adjustable relative to the rearwardly extending legs of the U-shaped bracket 12 by simply loosening the nuts on the bolts 17 and 18 and moving the support arms to the desired relative positions and thereafter re-tightening the nuts. Thus, it can be seen that the support arms 15 and 16 can be adjusted relative to the support bracket 12 and the shank 6 about an axis transverse to the length of the framework 12 and from one fixed position to another.

Attached to the lower and rearward portions 15b and 16b of the support arms 15 and 16 is a cross member 20 which has a pair of spaced support ears 21 and 22 mounted thereon. The support ears are apertured to receive bolts 23 and 24 which also pass through the rear end portions 15b and 16b of the support arms. Thus, it can be readily seen that the cross member 20 can be swung relative to the framework 11 about an axis transverse to the length of the framework 11 by simply loosening the nuts on the bolts 21 and 22 and then re-tightening them after the desired adjustment has been made. It will be noted that the end portions of the cross member 20 each extend a substantial distance laterally of the framework 11 and the shaft 6.

Mounted on the cross member 20 in spaced positions relative to the length of the cross member are a plurality of spring elements 25. These spring elements are connected together in pairs as best shown in Fig. 1 and are secured to the cross members by a bolt 26 which passes through the cross member. Each of these springs 25 supports a rigid rod-like agitator 27 which extends downwardly and rearwardly from the cross member 20. As best shown in Fig. 2, these agitators 27 are spaced laterally of the cross member 20 and are positioned at either side of the framework 11 so that when attached to the shank 6, as shown in Fig. 1, they are positioned at either side of the ground working implement 7. The lower end portions 28 of these agitators 27 are bent inwardly toward the framework 11 and the shank 6 and extend downwardly into the soil when the attachment is clamped to the shank 6 by means of the clamp 9. Because of the spring mounting afforded by the springs 25, these agitators 27 can move upwardly and downwardly within the soil swinging about the longitudinal axis of the cross member 20 when so desired.

Normally when a ground engaging or work tool, such as the shovel 7, moves through the soil it forms a ridge of soil to either side of its direction of travel. One of these ridges has been shown in Fig. 1 and indicated by the numeral 29. Unless some means are provided for leveling the soil, serious erosion may result and the ground will be left in a very unsatisfactory condition for future traveling thereacross by harvesting implements. This is especially true when such implements must pass transversely to the direction of travel of the ground working implement during its last passage through the corn. The lower end portions 28 of the agitators 27 extend downwardly into the soil as shown in Fig. 1 and agitate the soil causing the latter to be leveled in the wake of the shovel 7 so as to eliminate the undesirable conditions pointed out above. Because these end portions 28 are resiliently mounted by the springs 25, they move upwardly and downwardly continuously within the soil thereby further increasing the agitation of the soil and facilitating the leveling of the ridges 29. I have found that these agitators 27 do an excellent job of eliminating the ridges 29 which are normally left in the wake of such a shovel 7, and leave the soil in a very desirable condition, a substantial portion of the soil being moved together thereby to a position directly behind the shovel as the latter moves along through the soil. In addition, the constant upward and downward movement of the agitators 27 brings the weeds and roots thereof to the surface where the sunlight will more effectively dry them and thereby destroy them.

My present invention as disclosed and claimed herein has certain improvements over my invention disclosed and claimed in my prior application referred to hereinabove. I have found that although the ground leveling attachment disclosed and claimed in my former application results in a highly satisfactory manner so long as the shank of a ground working implement is true, it is unsatisfactory if the shank 6 is ever bent so that its lower end portion extends rearwardly with respect to its original position. In other words, I have found that it frequently occurs that when an unusually firm object such as a root of a tree, a stone, etc., is struck with the shovel 7, the shaft 6 sometimes is sprung rearwardly so that instead of the shank 6 extending vertically, it will thereafter tend to extend rearwardly of a vertical line from its point of mounting. My former attachment will not function satisfactorily when such deformation of the shank 6 takes place for, of course, it will move with its supporting shank 6 so that the rear end portion of the framework of that structure will swing upwardly and its agitators will either extend above the ground or will not penetrate the ground a sufficient distance to do the type of work required. My present attachment has the advantage that in the event the shank 6 is so deformed, the attachment can readily compensate for such deformation and continue to do as effective a job as it would prior to such deformation. By simply loosening the nuts of the bolts 17 and 18, the supporting arms 15 and 16 can be swung about a transverse axis so as to maintain the agitators 27 at the desired depth in the soil. Thus, it can be seen that my present attachment does not lose its efficiency as a result of such deformation of the shank 6 as will be the case with my attachment previously disclosed and claimed in my prior application.

In addition to the above advantage outlined in the previous paragraph, my present attachment has another added advantage in that the cross member can be rotated about a transverse axis relative to the support arms 15 and 16 by merely loosening the nuts of the bolts 23 and 24 and thereafter tightening the same. In this manner, the agitators 27 can be adjusted so that the angularity of the agitators relative to the ground can be varied as desired. If it is desired to obtain a maximum lump breaking function by these agitators in addition to the ground leveling function, the agitators 27 can be adjusted so as to more nearly approach a plane parallel to the surface of the ground. If it is desired to aid in working the soil as well as leveling the same, these agitators may be adjusted to a position more nearly approaching vertical. It can be readily seen that the extent to which the agitators extend downwardly into the soil can be readily adjusted by means of the adjustments made possible through the bolts 17 and 18 and 23 and 24. There are times when it is desirable for the operators of the ground working implement to only work the soil to a very shallow depth and in that event, unless such adjustment is provided, the agitators would be attempting to work the soil to a depth greater than the shovel 7. Such action would require substantially more power than necessary and would produce an undesired effect. By adjusting the cross member 20 relative to the framework 11, it is possible to position the agitators 27 at whatever depth is desired.

It should be noted that my ground leveling apparatus is of extremely cheap and simple construction and operation. Any unskilled laborer can attach my ground leveling attachment and adjust the same so that it will function in a very desirable manner. The cost of the materials is comparatively slight and the device functions in a highly efficient manner to level the ridges 29 which would normally be left in the wake of such a ground working tool. It will be noted that it is a simple matter to attach or detach this device relative to any ground working tool which may have been previously owned by the farmer.

It should also be noted that the inturned end portions 28 of the agitators 27 insure that the ground left in the ridges 29 will be moved into the wake of the line of travel of the shovel 7. The inturned portions 28 greatly facilitate the lateral movement of the soil to a position directly behind the shovel 7.

It will, of course, be understood that various changes may be made in the form, details, arrangement and proportions of the parts without departing from the scope of my invention.

What I claim is:

1. A ground leveling attachment for ground working implements having a supporting shank with a vertically extending portion, said attachment comprising a generally U-shaped framework having a forward portion and rearwardly extending side portions, clamp means extending substantially horizontally through said forward portion of said framework and adapted to fixedly secure the same to the vertically extending portion of such a supporting shank, said forward portion being fixedly but adjustably connected to said rearwardly extending portions, said framework extending rearwardly from said clamp means when so secured, a cross bar adjustably supported by the end portions of the rearwardly extending side portions, and a plurality of resiliently mounted downwardly extending rigid rod-like agitators having helically shaped upper portions fixedly secured to the cross bar, the agitators being spaced laterally of said clamp means, said agitators having lower end portions extending downwardly into the soil and agitating and leveling the same when said framework is so secured to the vertically extending portion of such a ground working implement.

2. A ground leveling attachment for a ground working implement having a supporting shank with a vertically extending portion, said attachment comprising a generally U-shaped framework having a forward portion and rearwardly extending side portions, clamp means carried by said forward portion of said framework and adapted to fixedly secure the same to the vertically extending portion of such a supporting shank, said forward portion being fixedly but adjustably connected to said rearwardly extending portions, a cross bar fixedly but adjustably connected to and closely adjacent the ends of said rearwardly extending portions and transversely of said portion, a plurality of helical springs encircling said cross bar with each spring having one end secured to the cross bar and the other end terminating in a downwardly and rearwardly extending rod-like agitator adapted to extend into the soil, said agitators being spaced laterally outside the maximum width of the ground working implement, said soil penetrating agitators functioning to level the soil when said framework is operatively connected to the vertically extending portion of the ground working implement.

3. A ground leveling attachment as disclosed in claim 2 wherein said soil penetrating portions of said agitators extend inwardly and downwardly in a transverse direction to the line of travel of the ground working implement.

References Cited in the file of this patent

UNITED STATES PATENTS

| | | |
|---|---|---|
| 965,961 | Swanson | Aug. 2, 1910 |
| 1,202,562 | Mintern | Oct. 24, 1916 |
| 1,333,854 | Kuher | Mar. 16, 1920 |
| 2,136,851 | Jess | Nov. 15, 1938 |